US005188378A

United States Patent [19]

Erlenkeuser

[11] Patent Number: 5,188,378

[45] Date of Patent: Feb. 23, 1993

[54] CHUCK FOR POLYGONAL SHANK ENDS OF TOOLS

[75] Inventor: Gerd Erlenkeuser, Mettmann, Fed. Rep. of Germany

[73] Assignee: Wera Werk Hermann Werner GmbH & Co., Wuppertal, Fed. Rep. of Germany

[21] Appl. No.: 752,660

[22] PCT Filed: Jan. 11, 1990

[86] PCT No.: PCT/EP91/00033

§ 371 Date: Aug. 21, 1991

§ 102(e) Date: Aug. 21, 1991

[87] PCT Pub. No.: WO91/10541

PCT Pub. Date: Jul. 25, 1991

[30] Foreign Application Priority Data

Jan. 11, 1990 [DE] Fed. Rep. of Germany ... 9000245[U]

[51] Int. Cl.[5] .............................................. B23B 31/22

[52] U.S. Cl. .............................................. 279/22; 279/75; 279/82; 279/905

[58] Field of Search ..................... 279/22, 30, 75, 905, 279/906, 82, 804; 408/226, 239 R

[56] References Cited

U.S. PATENT DOCUMENTS

| | | | |
|---|---|---|---|
| 1,642,490 | 9/1927 | Decker | 279/82 X |
| 2,518,134 | 8/1950 | Hallowell et al. | |
| 3,251,605 | 5/1966 | Ondeck | 408/239 X |
| 3,428,327 | 2/1969 | Sindelar | 279/82 |
| 4,209,182 | 6/1980 | Sheldon | 279/75 |
| 4,287,923 | 9/1981 | Hornung | 279/30 X |
| 4,629,073 | 9/1987 | Martindell | 279/75 X |
| 4,629,375 | 12/1987 | Lieser | 279/75 X |
| 4,900,202 | 2/1990 | Weinhold | 279/22 X |

FOREIGN PATENT DOCUMENTS

| | | |
|---|---|---|
| 134975 | 7/1984 | European Pat. Off. . |
| 1254549 | 11/1967 | Fed. Rep. of Germany . |
| 2934428 | 3/1981 | Fed. Rep. of Germany . |
| 3324756 | 1/1985 | Fed. Rep. of Germany . |
| 8901367 | 7/1989 | Fed. Rep. of Germany . |

*Primary Examiner*—Steven C. Bishop
*Attorney, Agent, or Firm*—Martin A. Farber

[57] ABSTRACT

A chuck for polygonal shank ends of tools, has a bushing (5) which transmits the drive force and corresponds in its cavity (8) to the polygon cross section of the shank end (32). The bushing has a window-shaped opening in which a ball (22) is arranged as pressing member which acts on the shank. Behind the bushing there is arranged an actuating sleeve (11) which is displaceable against spring action and which lies in front of support shoulders in the region of the inner edge of the opening (23). In order to obtain an optimal form of use, the ball (22) is more than twice as great as the width of the corner recess (31) lying in the axial direction of the shank. The clamping surface (19) is inclined in wedge shape in the direction of action of the spring, and extends at an angle to the longitudinal axis of the chuck which lies within a self-locking region.

4 Claims, 6 Drawing Sheets

CHUCK FOR POLYGONAL SHANK ENDS OF TOOLS

FIELD AND BACKGROUND OF THE INVENTION

The present invention relates to a chuck.

Such a chuck is known from Federal Republic of Germany 29 34 428 C2, in which the window-like opening in the bushing which receives the ball debouches within the region of one of the hexagon surfaces of the cavity. The opening is developed as a slot which extends in the direction of insertion of the tool. In the region of its inner edge the inner wall is provided with support shoulders in the manner that two linearly extending support shoulders are connected together by arcuately shaped support shoulders. Since the slot is to be produced by means of an end mill, the support shoulders are of identical cross sectional shape. The slot shaped opening is provided so that the ball may carry out a movement in the insertion direction even in the event of insufficient displacement of the actuating sleeve.

The object of the present invention is to manufacture a chuck of this type, in a manner simple to manufacture, in such a way that, in addition to easy insertion and release of the tool, a large holding force acts on the inserted tool upon a pulling load acting on it in the direction of removal.

SUMMARY OF THE INVENTION

As a result of this development, the value in use of a chuck of this type is increased. Even in the case of a small size, a firm seat of the inserted tool in the cavity of the bushing is obtained. For the insertion of the tool the ball does not have to be pushed back by it. The actuating sleeve is merely displaced against spring load so that the tool can be introduced unimpeded into the cavity. When the tool is inserted, one of the corner recesses is aligned with the ball which through the released actuating sleeve comes into twopoint application against the surfaces of the corner recess on the shank end of the tool, which surfaces are in prismlike relationship to each other. In combination with the downwardly dropping clamping surface of the actuating sleeve and this two-point application, a real interlocking is obtained which is capable of taking up particularly large pulling loads. Therefore, pulling forces of 150 to 200 newtons can be exerted on the tool without it leaving the cavity.

The fact that materials of high strength are selected for the tool as well as for the ball contributes to the obtaining of this high holding force. This applies essentially also to the actuating sleeve so that the two-point application of the ball in combination with a slight entrance into the corner recess creates the firm seat. If one disregards deformation, the release of the tool must be effected intentionally, namely, by displacing the actuating sleeve against spring action, in which case the clamping surface moves away from the ball, with release thereof in radial direction. After release the tool can again be easily removed. When the actuating sleeve is not displaced in the direction of release, a force acting on the ball is not able to displace the actuating sleeve since the clamping surface has such an angle to the longitudinal axis of the chuck that a self-locking effect is thereby produced. In detail, such dimensional agreement is selected that the diameter of the ball is smaller than half the corner dimension of the shaft end and more than twice as great as the width of the corner recess in the axial direction of the shank. Therefore the above-mentioned large holding force can be produced with ball diameters of, for instance, 2 to 3 mm.

It is furthermore advantageous if the support shoulders of the cavity passing through one of the polygon edges are, as seen in circumferential direction, of different thickness. Bit-shaped tools produced with larger tolerances can also be held sufficiently firmly. This is true, in particular, of tools which are produced by cold working. If tools of large undersize are used, the ball can penetrate directly up to the support shoulders and rest there. Due to the fact that the support shoulders are of different size, there is also a different rolling behavior of the ball within the opening. Since the thickness of the support shoulders decreases towards the diametrically opposite regions of the cavity in the direction of insertion, the rolling behavior of the ball in the direction of withdrawal of the tool is less favorable than in the direction transverse thereto, which also contributes to an improved seat of the tool. In practice, the thickness of the support shoulders can be reduced to zero. Nevertheless, sufficient support is present by the support shoulders which extend transverse thereto. The arrangement of the opening which forms the support shoulders at the height of one of the polygon edges makes it possible for the wall thickness of the bushing to be kept small as compared with the previously known embodiment, together with the reduced shape, without a reduction in the diameter of the ball resulting from this.

BRIEF DESCRIPTION OF THE DRAWINGS

One embodiment of the invention will be described below with reference to FIGS. 1 to 9 of the drawing, in which.

DETAILED DESCRIPTION OF THE PREFERRED EMBODIMENTS

Figure 1:
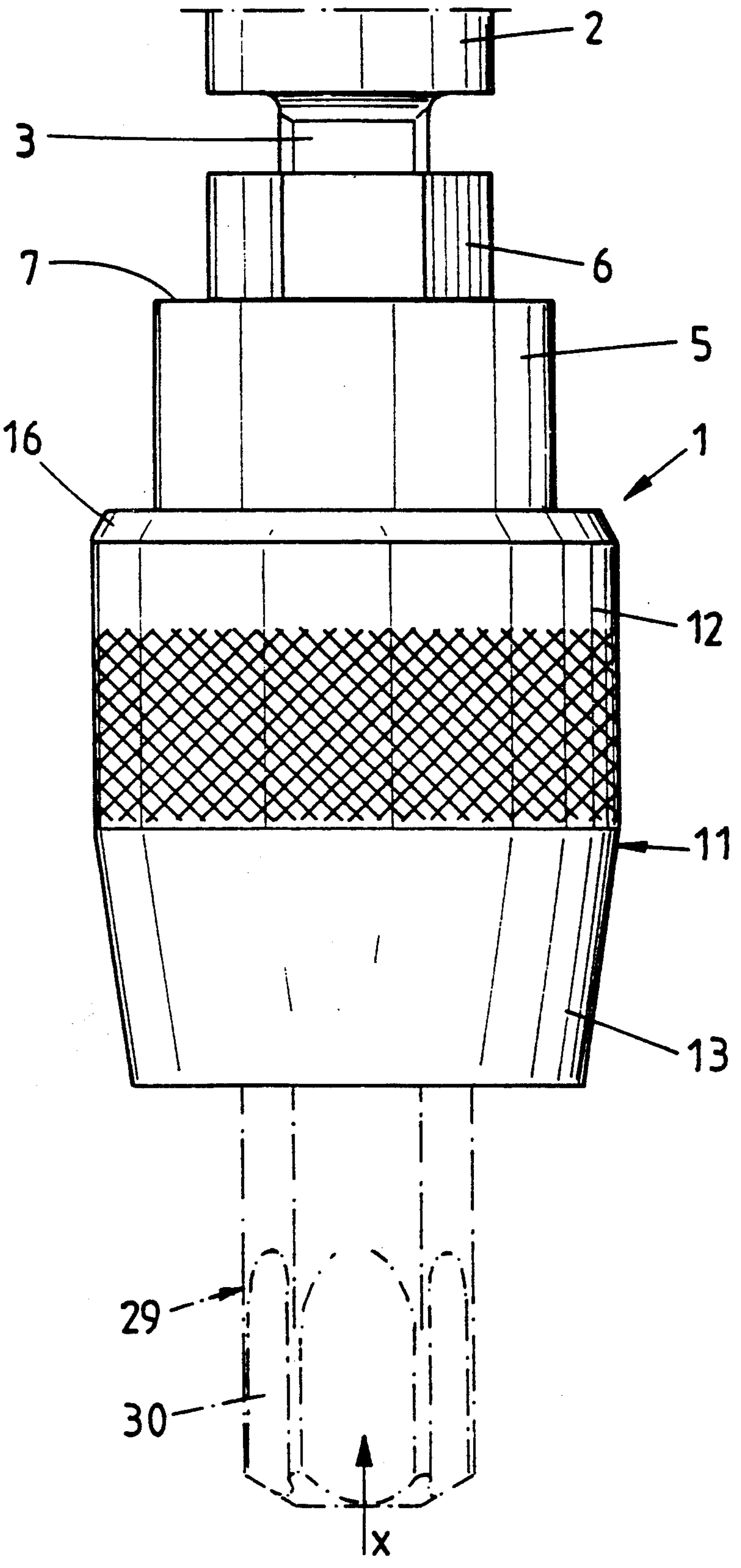
FIG. 1 shows, in an approximately 5x enlargement, a chuck developed in accordance with the invention with tool developed as screwdriver bit indicated in dot-dash line.

The chuck, designated generally as 1, has a clamping pin 2 which is continued by a threaded bolt 3 which is stepped down. The bolt engages in a central threaded hole in a bushing 5. The fixing of the screwed-in position of the threaded bolt 3 is assured by a lock nut 6 arranged on it which is clamped against the facing end 7 of the bushing 5.

The threaded hole 4 debouches into a cavity 8 of hexagonal cross section which extends in the longitudinal direction of the bushing 5. The length of the cavity is greater than that of the threaded hole 4. The bushings can be so turned on the threaded bolt 3 that the latter also extends into the inside of the cavity 8. In the embodiment shown, the end of the threaded bolt 3 terminates flush with the bottom 9 of the cavity 8.

Figure 2:
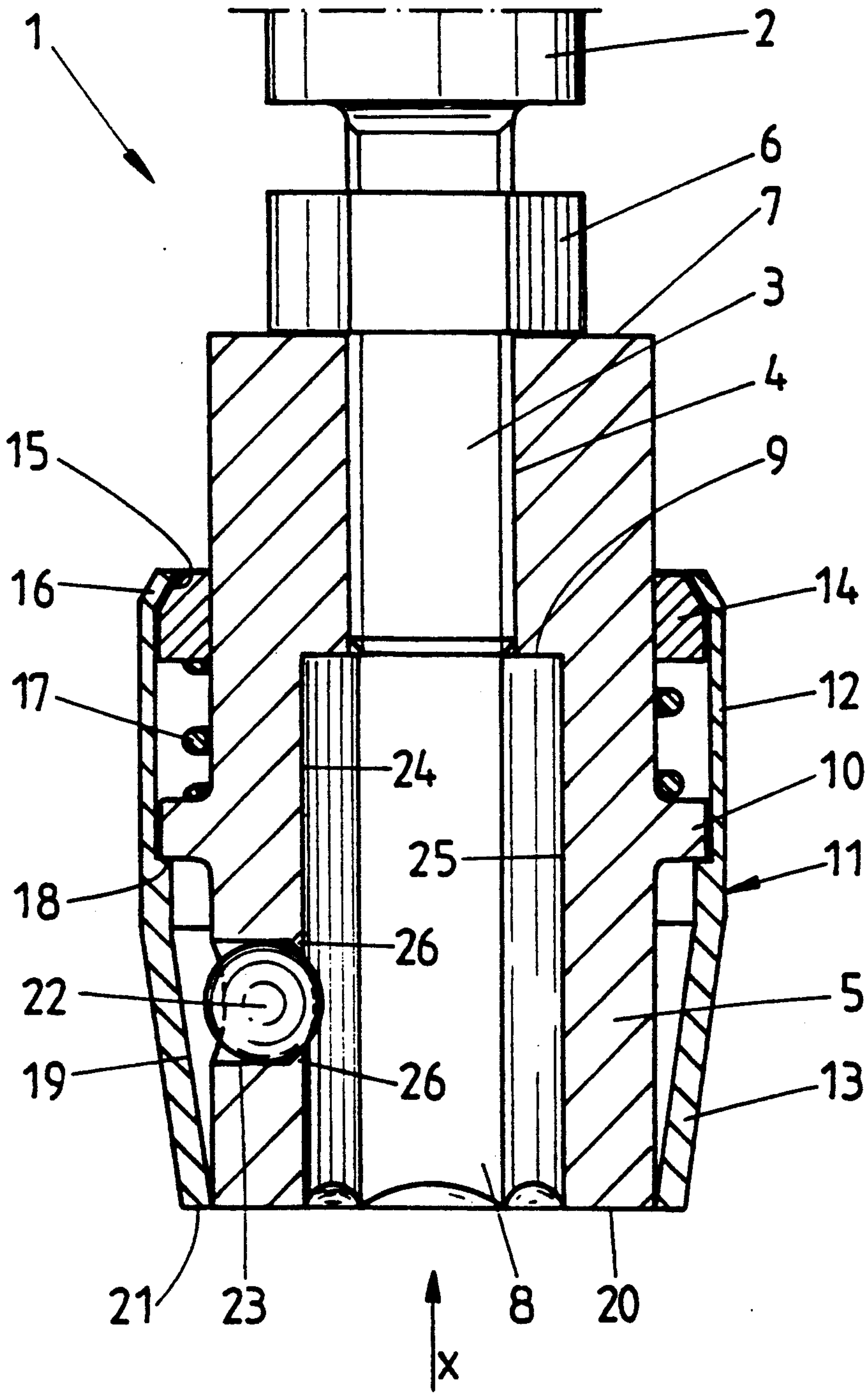
FIG. 2 is a longitudinal section through the chuck, without tool.

In its central region, the bushing 5 is provided with an outwardly directed collar 10 which also serves for the guiding of an actuating sleeve 11 which surrounds the bushing 5. Said sleeve has a cylindrical section 12 and a conical section 13. The cylindrical section 12 is guided by the collar 10 of the bushing 5. At the free end of the cylindrical section 12 there is a guide ring 14 having an end bevel 15 which is gripped over by an inwardly directed flanging 16 of the cylindrical section 12. The one end of a compression spring 17 surrounding the bushing 5 rests against the guide ring 14. The other end of said spring rests against the collar 10. In this way, the actuating sleeve 11 is acted on in the direction of insertion x of the tool. The actuating sleeve 11 is provided with a stop limitation by an inner annual step 18 present in the transition region between the two sections 12, 13, by means of which step the actuating sleeve 11 comes against the collar 10; see FIG. 2.

The conical section 13 has, on the inside of the bushing, a clamping surface 19 which is inclined in wedge shape. This surface extends at an angle $\alpha$ of 85° to the longitudinal direction of the chuck and is thus present in the region of the self-locking. The smallest diameter of the clamping surface 19 corresponds to the outside diameter of the bushing 5. From FIG. 2 it can, furthermore, be noted that, when the tool is not inserted, the lower end 20 of the bushing 5 is approximately on a line with the free end 21 of the actuating sleeve 11.

The clamping surface 19 cooperates with a ball 22 of a diameter d of about 3 mm which represents a pressing member. The ball is so arranged in a radial opening 23 in the bushing 5 that the longitudinal axis of the opening 23 developed as bore intersects the corresponding polygon edge 24 and also the polygon edge 25 which extends diametrically thereto. The opening 23 is produced by drilling in such a manner that support shoulders 26, 27 remain in the region of the inner edge of the opening. As can be clearly noted from FIGS. 4–7, the support shoulders 26, 27 are of different thickness in such a manner that the thickness of the support shoulders 27 decreases towards the regions of the cavity 8 which are diametrically opposite each other in the direction of insertion. Accordingly, the support shoulders 26 which lie in the region of the polygon edge 24 have a smaller thickness than the support shoulders 27 which extend transversely thereto. The latter are dimensioned so large that they provide good support for the ball. The drilling of the opening 23 could be effected in such a manner that the thickness of the support shoulders 26 could be decreased to a value of zero. Nevertheless, the remaining support shoulders 27 directed transverse thereto would still provide sufficient support for the ball 22.

Figure 6:
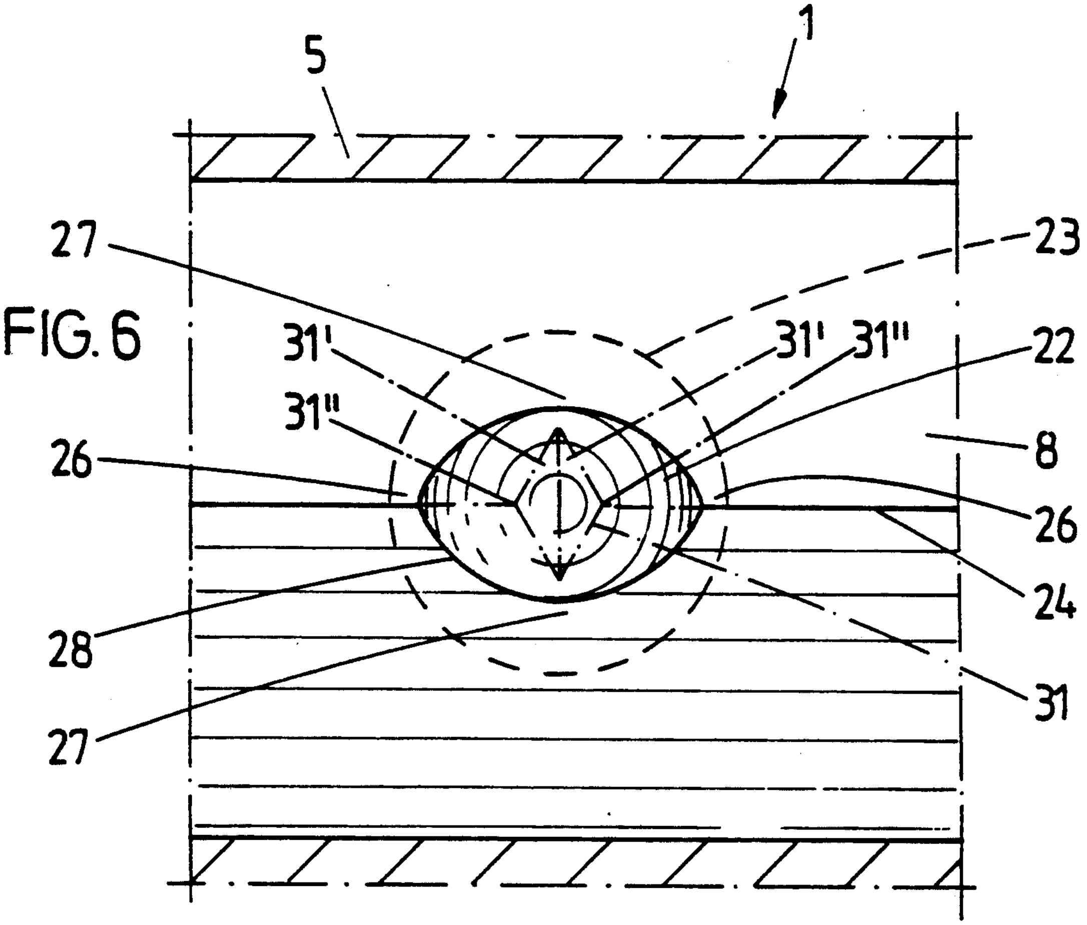
FIG. 6 is a view in the direction of the arrow VI in FIG. 5.
Figure 7:
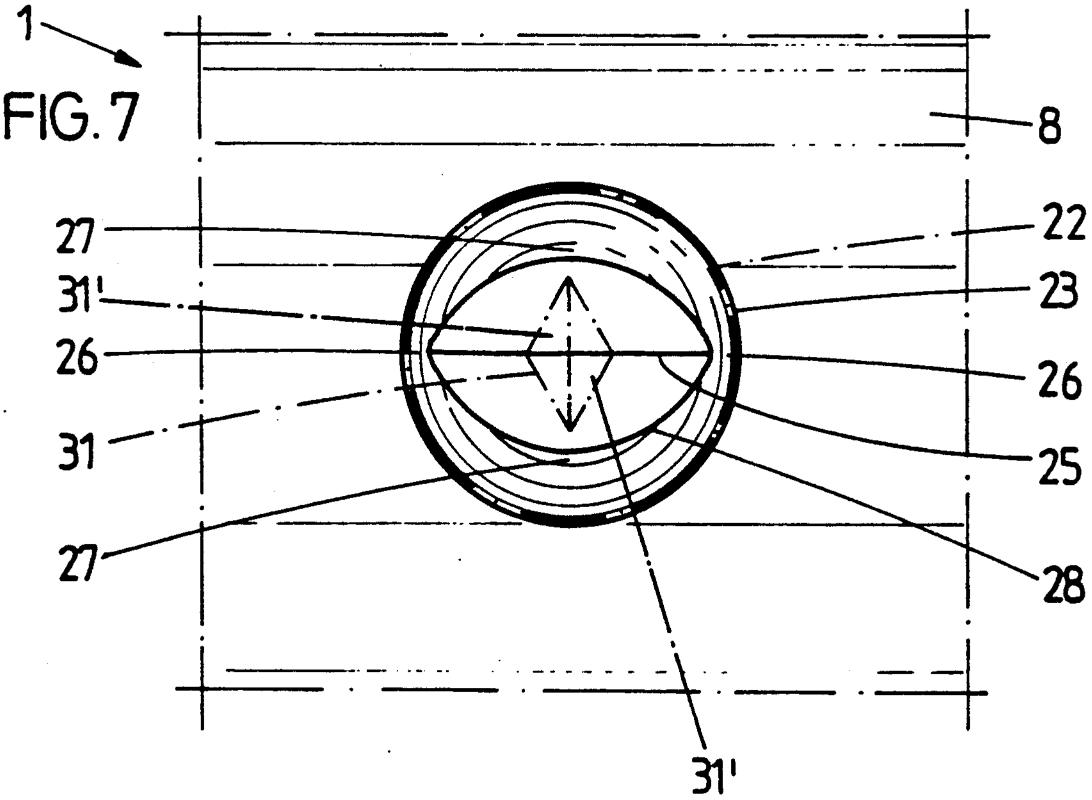
FIG. 7 is a view in the direction of the arrow VII in FIG. 4.
Figure 9:
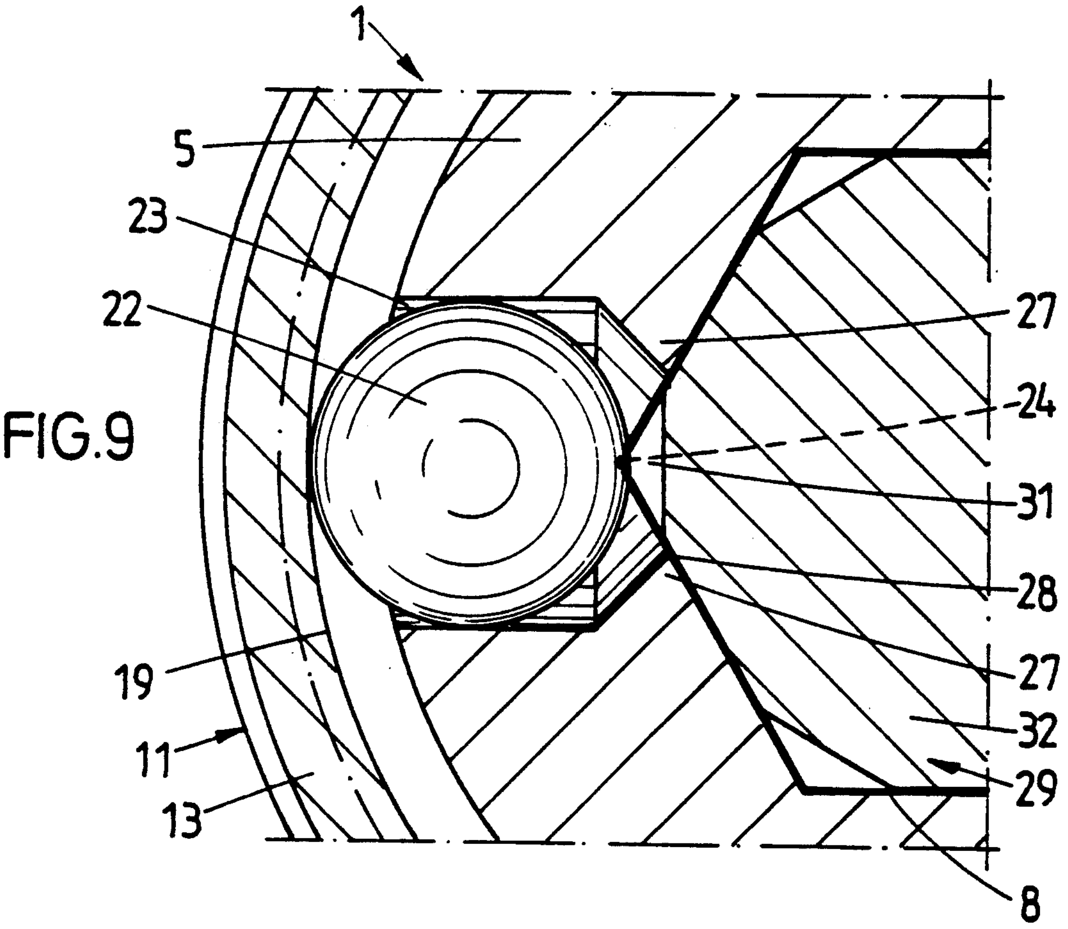
FIG. 9 is a section along the line IX—IX in FIG. 8.

From FIGS. 6 and 7, it can be noted that the opening 23 debouches in an approximately oval opening 28 in the facing polygon edge 24, producing the support shoulders 26, 27 of different thickness and area.

The tool in the embodiment shown is a screwdriver bit 29 of hexagonal cross section which is adapted to the cross section of the cavity 8. There is a distance between flats of 6.3 mm and the corner dimension E is about 7.2 mm. The screwdriver bit 29 has a working end 30 and forms the corresponding blade there. In the opposite shank end 32 there are corner recesses 31 lying on the same cross-sectional plane. The run-out angle $\beta$ thereof can be between 60° and 120° in accordance with the existing standards. The width w lying in axial direction amounts in the embodiment shown to about 0.9 mm, depending on the size of the run-out angle. Accordingly, the diameter d of the ball 22 of 3 mm is less than half of the corner dimension E of 7.2 mm of the shank end and more than twice as great as the width w lying in the axial direction of the shank. In the inserted condition of the screwdriver bit 29, the corner recesses 31 lie at the same height with respect to the axial center of the opening 23 or to the ball 22.

Figure 3:
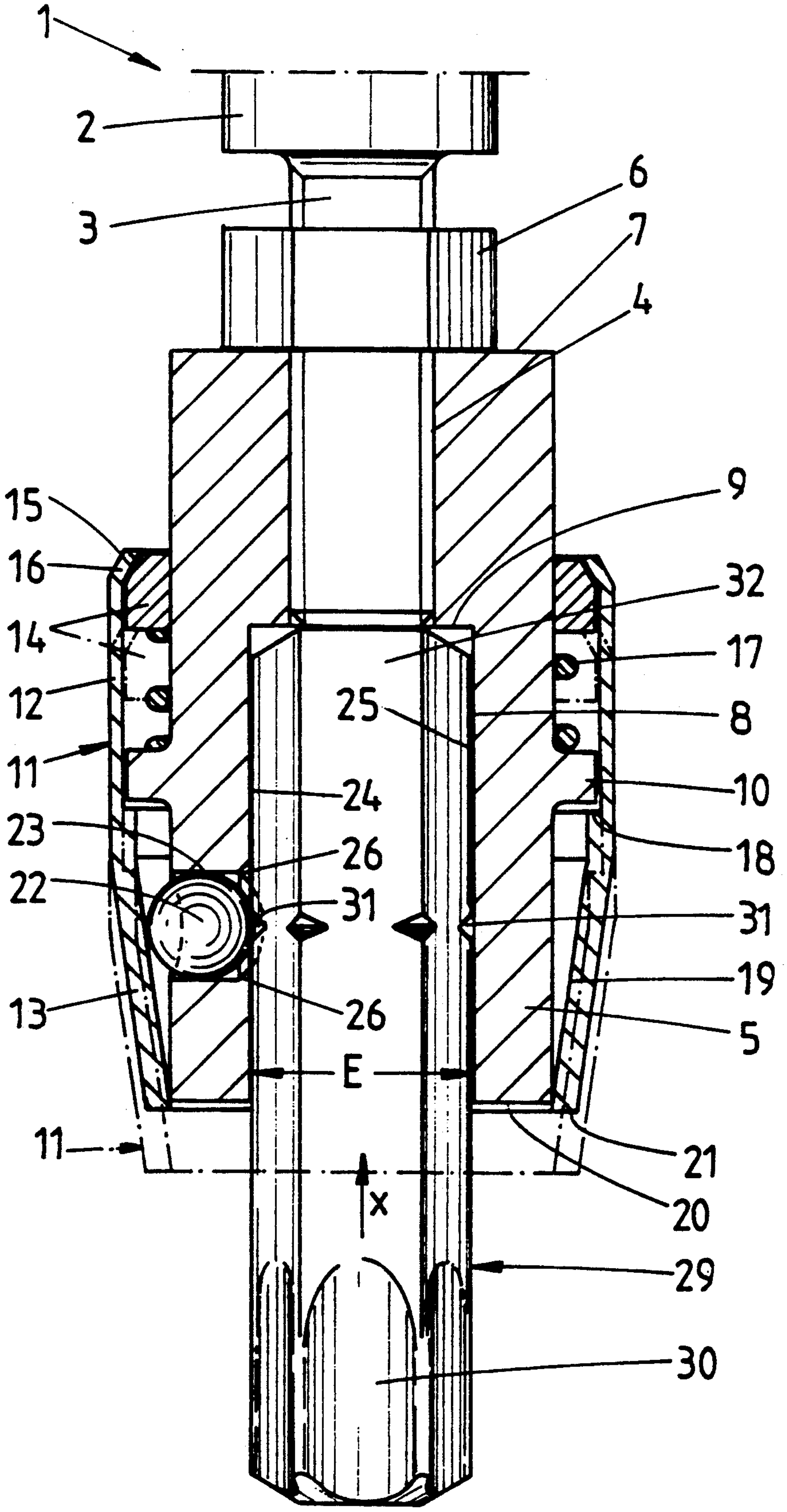
FIG. 3 is also a longitudinal section through the chuck, but with the tool inserted.
Figure 5:
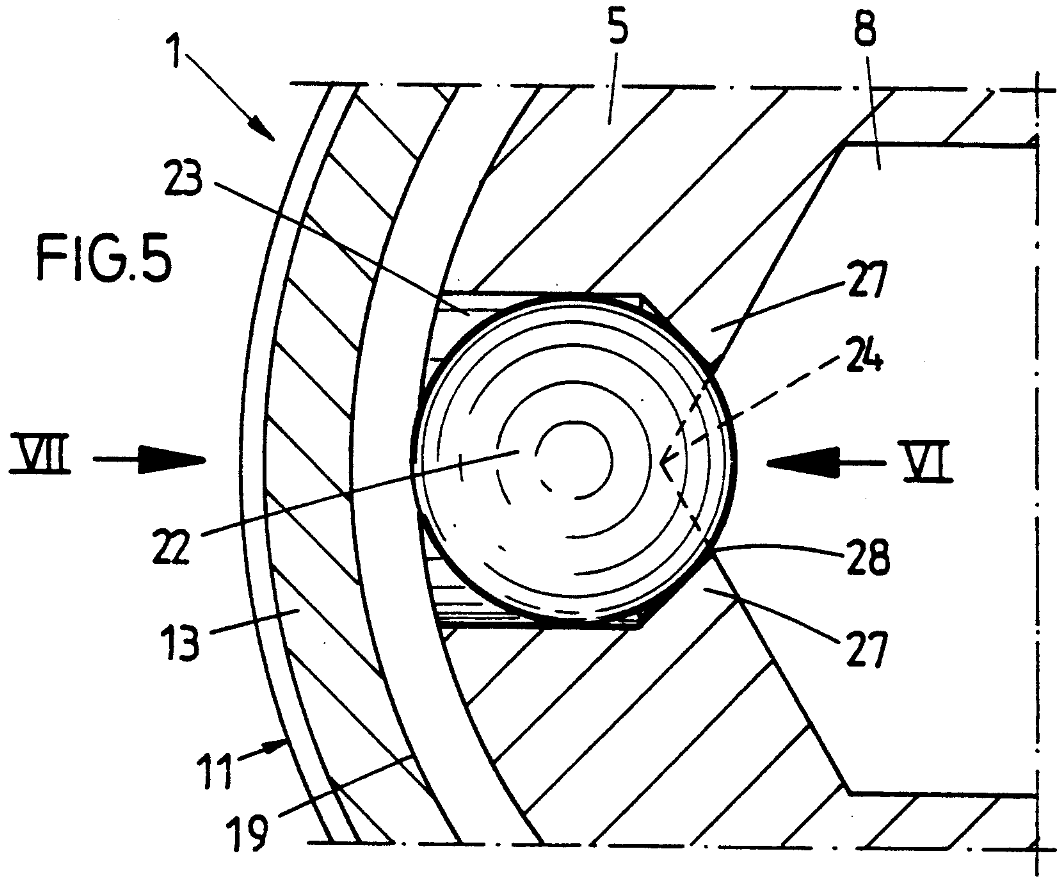
FIG. 5 is the corresponding section along the line 5—5 in FIG. 4.
Figure 4:
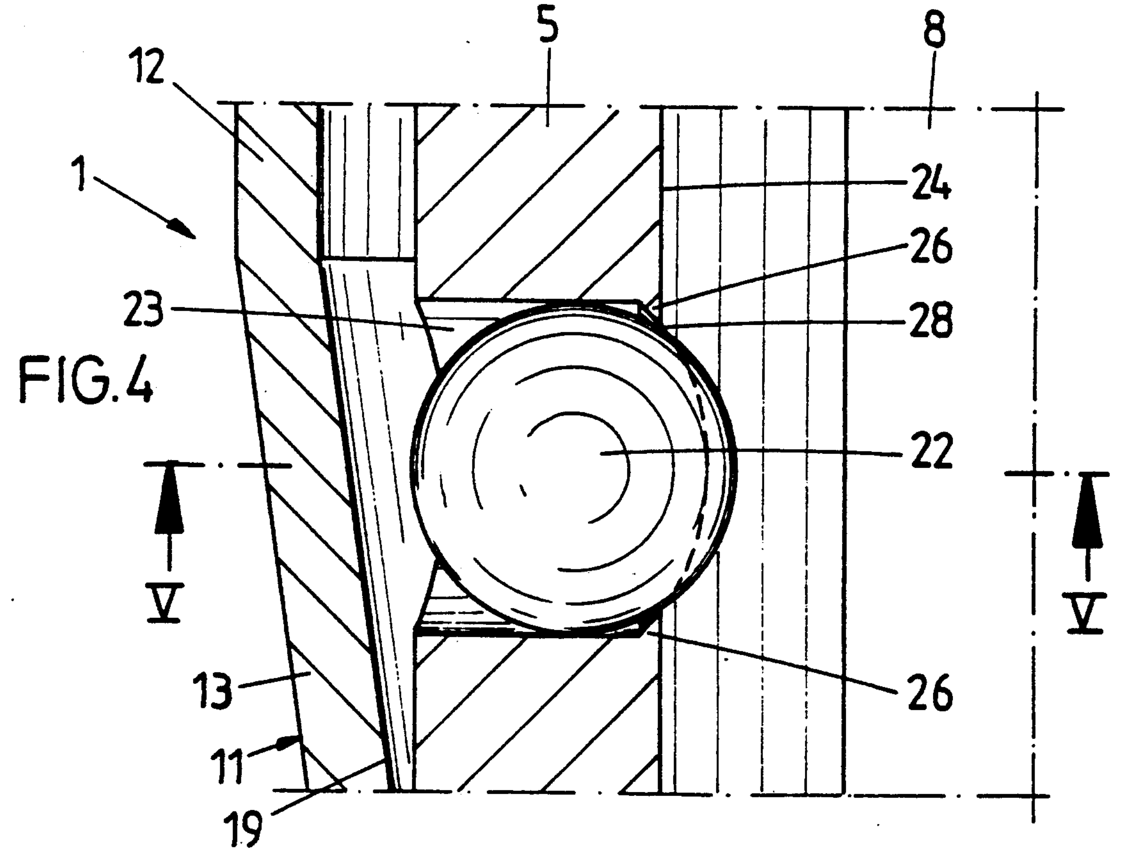
FIG. 4 is a longitudinal section, in about 15x enlargement, through a portion of the chuck in the region of the ball, without tool inserted.
Figure 8:
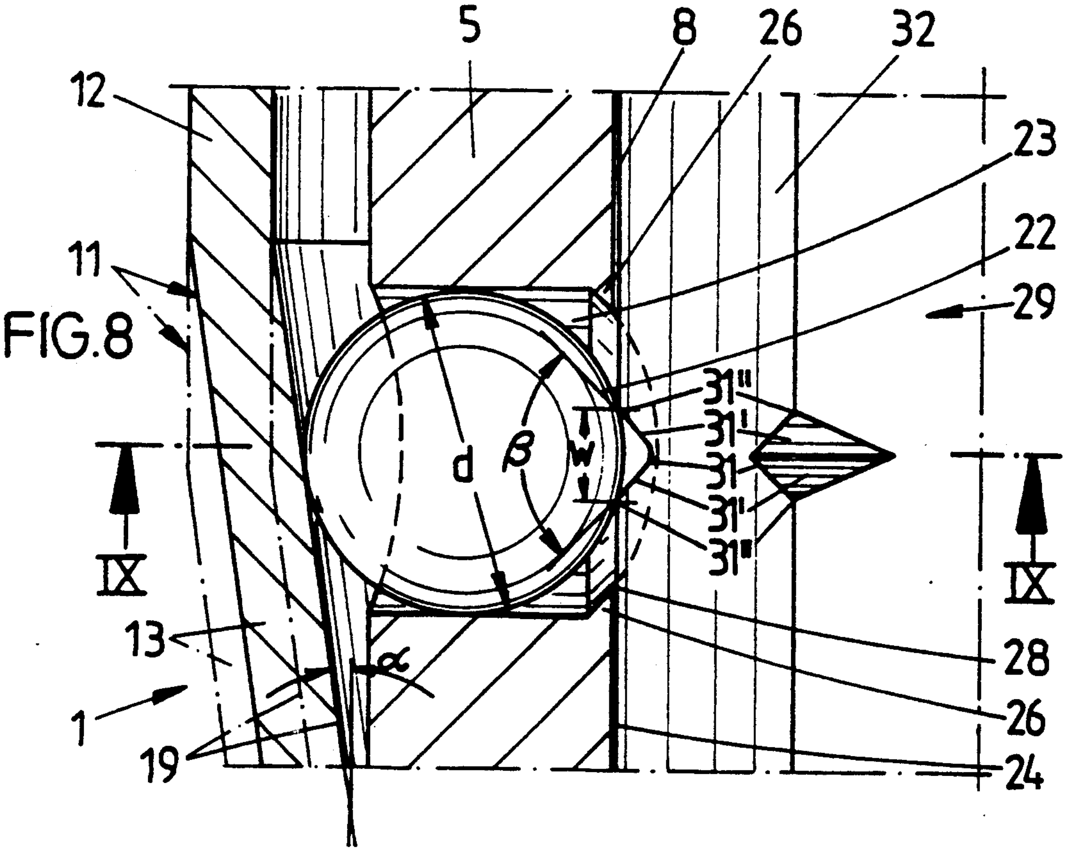
FIG. 8 is a longitudinal section of a portion corresponding to FIG. 4, with tool inserted.

The insertion of the screwdriver bit 29 requires a displacement of the actuating sleeve 11 in direction opposite the direction of insertion x, namely into the dot-dash position shown in FIG. 3. The clamping surface 19 of the actuating sleeve 11 thus provides the corresponding free space for the ball 22 so that it can move outward in radial direction upon the insertion of the screwdriver bit 29. The movement of insertion is limited when the screwdriver bit 29 strikes the bottom 9 of the cavity. The actuating sleeve 11 can now be released, whereupon the compression spring 17 causes a displacement thereof in the direction of insertion x. In this connection, the clamping surface 19 strikes the ball 22 and pushes it against the screwdriver bit 29, in which connection the protruding section of the ball extends into the facing corner recess 31 of the screwdriver bit 29 with simultaneous production of a two-point application on the surfaces 31', in prism relationship to each other, of the corresponding corner recess 31 at the height of their run-out side corner points 31''. Each of these two corner points 31 '' the point of intersection of 3 edges which meet each other, as can be noted particularly clearly from FIG. 8. In this way, by means of an interlock, there is obtained an extremely stable, firm seat of the inserted screwdriver bit. Forces acting in the direction of withdrawal of the screwdriver bit further increase the seat of the screwdriver bit in the cavity 8 of the bushing 5. Via the clamping surface 19 and ball 22, furthermore, the ridge-like region of the screwdriver bit 26 lying opposite the ball is forced into the corresponding corner formed by the two corresponding hexagon surfaces and accordingly is centered in the cavity 8. Even if larger tolerances should occur upon the manufacture of the screwdriver bit, a sufficiently firm seat of the screwdriver bit in the cavity 9 is always assured as a result of the large path of displacement of the ball in the opening 23 so that a slot-like opening can be dispensed with, together with the advantages resulting from this such as, for example, simplified production of the opening.

If the tolerances of the screwdriver bit are at the lower limit, then the ball 22 can rest against the support shoulders 26, 27 when the screwdriver bit is inserted. Since the support shoulders 26 are not as thick as the support shoulders 27, there is also a different rolling behavior of the ball 22, in the manner that the rolling behavior present in the direction or insertion or of withdrawal of the tool is less favorable, whereby an additional braking effect is produced.

The release of the screwdriver bit 29 from the cavity 8 requires intentional displacement of the actuating sleeve 11 in the direction of insertion x of the tool so that, upon subsequent pull on the tool opposite the direction of insertion x the ball 2 move away in radially outward direction, releasing the screwdriver bit. Upon both the insertion and the release thereof, it need not overcome any spring forces so that this represents a substantial advantage in use.

I claim:

1. A chuck for a polygonal shank end of a tool, comprising a bushing for transmission of a driving force, the bushing having a cavity corresponding in shape to the polygonal cross section of the shank end;

a ball, the bushing having a window-shaped opening in which the ball is disposed to serve as pressing member which acts on the shank upon insertion of the shank into the cavity;

an actuating sleeve encircling the bushing and enclosing the window-shaped opening and being displaceable against spring action;

wherein the diameter of the ball is greater than the thickness of a wall of the bushing;

the actuating sleeve has an internal inclined clamped surface which presses against the ball upon activation of the sleeve;

the window-shaped opening has a first set and a second set of support shoulders for engagement with the ball, all of said support shoulders being located at an edge of said window-shaped opening face said cavity, the window-shaped opening communication with the chamber at one polygonal edge thereof;

the shank end has a recess for receiving the ball, the recess being located at a polygonal edge of the shank end, the recess having a V-shape with two triangular sidewalls, each sidewall having a vertex opposite a groove of the recess for engaging the ball;

the ball extends partially into the cavity and lies with two-point applicatin against the vertices of the sidewalls of the recess; and a diameter of the ball is less than half a diameter of the shank end and more than twice as large as a spacing between the vertices of the sidewalls of the recess, the groove of the recess extending in a plane perpendicular to an axis of the tool.

2. A chuck according to claim 1, wherein the first set of support shoulders have a thickness which differs from a thickness of the second set of support shoulders.

3. A chuck according to claim 1, wherein the support shoulders of the first set are located in a longitudinal plane of the cavity, and the support shoulders of the second set are located in a transverse plane of the cavity; and the thickness of the support shoulders of the first set decreases with progression toward the cavity.

4. A chuck for a polygonal shank end of a tool comprising a bushing for transmission of a driving force, the bushing having a cavity corresponding in shape to the polygon cross section of the shank end;

a ball, the bushing having a window-shaped opening in which the ball is disposed to serve as pressure member acting on the shank upon insertion of the shank into the cavity;

a spring supported by the bushing, and an actuating sleeve encircling the bushing and enclosing the window-shaped opening and being displaceable against action of the spring;

wherein the diameter of the ball is greater than the thickness of a wall of the bushing;

the actuating sleeve which presses against the ball upon activation of the sleeve;

the window-shaped opening has a first set and a second set of support shoulders for engagement with the ball, all of said support shoulders being located at an edge of said window-shaped opening facing said cavity, the window-shaped opening communicating with the chamber at one polygonal edge thereof;

the shank end has a recess for receiving the ball, the recess being located at a polygonal edge of the shank end, the recess having a V-shape with two triangular sidewalls, each sidewall having a vertex opposite a groove of the recess for engaging the ball;

the ball has a diameter which is less than half of a diameter of the shaft end, and extends partially into the cavity;

the ball lies in two-point application against the vertices of the sidewalls of the recess;

the diameter of the ball is more than twice as great as a spacing between the vertices of the sidewalls of the recess, the groove of the recess extending in a transverse plane of the shank end; and the clamping surface of the sleeve is inclined in wedge shape manner in a direction of action of the spring, and is angled relative to a longitudinal axis of the chuck, angulation of the clamping surface being within a self-locking region.

* * * * *